C. F. LEOPOLD.
Meat Cutter.
No. 230,708. Patented Aug. 3, 1880.
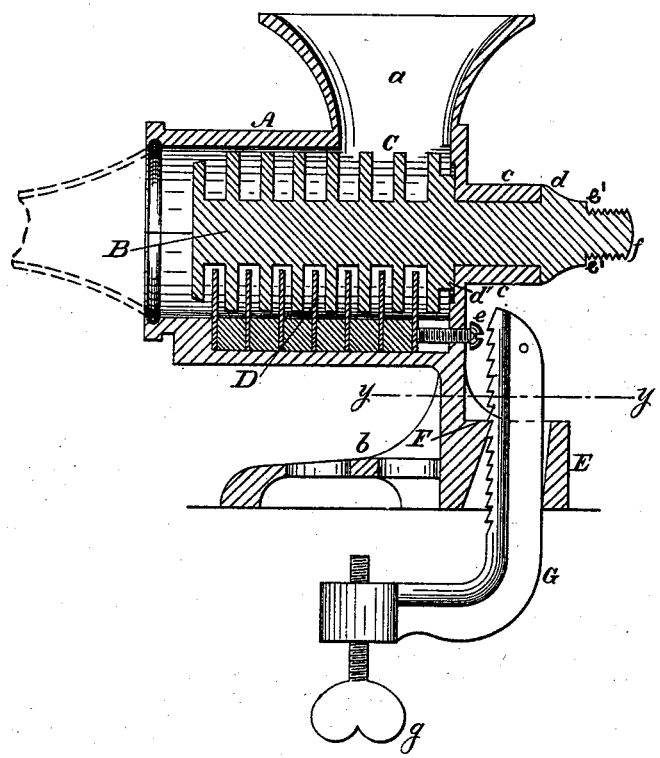
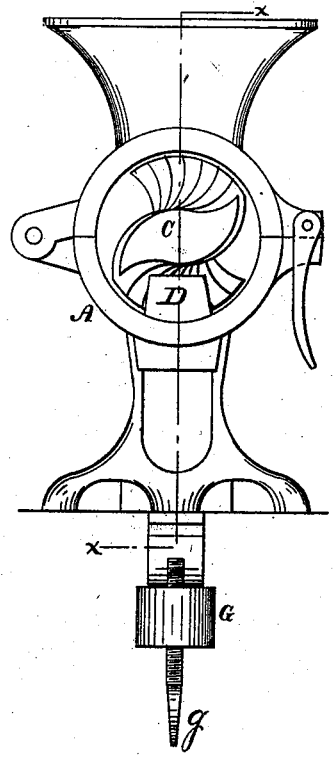
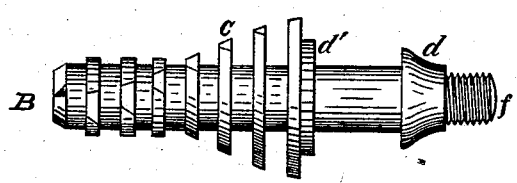
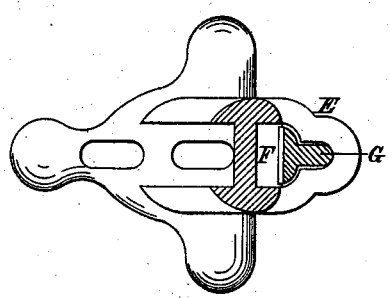
Witnesses:
A. P. Grant,
W. F. Kircher
Inventor:
Charles F. Leopold,
by John A. Wiedersheim,
ATTORNEY.

UNITED STATES PATENT OFFICE.

CHARLES F. LEOPOLD, OF PHILADELPHIA, PENNSYLVANIA, ASSIGNOR TO LLOYD, SUPPLEE & WALTON, OF SAME PLACE.

MEAT-CUTTER.

SPECIFICATION forming part of Letters Patent No. 230,708, dated August 3, 1880.

Application filed December 22, 1879.

*To all whom it may concern:*

Be it known that I, CHARLES F. LEOPOLD, of the city and county of Philadelphia, and State of Pennsylvania, have invented a new and useful Improvement in Meat Cutters or Mincers, which improvement is fully set forth in the following specification and accompanying drawings, in which—

Figure 1 is a vertical section of the cutter or mincer embodying my invention in line $x\,x$, Fig. 2. Fig. 2 is an end view thereof. Fig. 3 is a face view of a detached part thereof. Fig. 4 is a horizontal section in line $y\,y$, Fig. 1.

Similar letters of reference indicate corresponding parts in the several figures.

This invention consists of a meat cutter or mincer having a clamp for firmly and adjustably connecting the device to a table or other support, said clamp engaging with a boss formed with the supporting-foot, both foot and boss constituting a base for the device and sustaining it when the device is not used.

Referring to the drawings, A represents the casing, formed of sections hinged together for access to the interior thereof, the upper section having a hopper, $a$, and the lower section resting on a foot, $b$.

B represents a shaft which is mounted at one end on bearings $c$, at one side of the casing A, and formed with two collars, $d\,d'$, which are so disposed that one laps the outer edge of the bearings $c$ and the other the inner edge thereof, by which means the shaft, sustained only at one end, is properly mounted and prevented from longitudinal displacement.

Cast with the shaft are wings or arms C C, which project therefrom, separated from each other, and are set back one from the other, so that the edges of the several wings or arms form spirals from the inner collar, $d'$, to the termination of the shaft.

From the base of the inner face of the lower section of the casing rise knives or blades D, which are separated from each other by means of plugs and held in place by the set-screw $e$, fitted to the casing A.

The shaft B is extended from the collar $d$, as at $f$, for attachment of the crank-handle or band-wheel.

It will be seen that when the crank-handle is rotated and pieces of meat are introduced into the hopper $a$ the wings C draw the meat into the casing, force it against the knives or blades D, whereby it is cut or minced, and press it toward the end of the casing opposite to the bearing $c$, said end being entirely open or provided with a spout for purposes of discharge or direction elsewhere.

The shaft B and wings C are readily removable from the case for purpose of cleansing the casing and affording access to the knives D, and as the wings and shaft are cast in one there are simplicity and strength in their construction, and as the shaft is mounted in the manner hereinbefore set forth I avoid complication and expense in the production of the cutter or cutter device.

Owing to the shoulder $e'$ of the shaft B, adjacent to the attaching end $f$ of said shaft, the boss of the handle screwed on the end $f$ abuts against said shoulder, whereby there are no strain and binding of the handle on the bearing $c$ of the casing A.

The inner face of the casing may be painted or enameled for preventing the formation of rust or imparting taste of metal to the meat.

E represents a boss formed with or secured to the foot $b$, its opening extending vertically. On the wall of said opening is a tooth, F, which is adapted to engage with one of the teeth of a clamping-arm, G, whose lower limb is provided with a set-screw, $g$. The arm is inserted in the boss E and the foot $b$ rested on a table or other support. The foot is then raised to full extent, restrained by contact of the screw $g$ against the under side of said table. One of the teeth of the arm G engages with the tooth of the boss, and by tightening the screw said arm clamps the cutter securely to the table, the arm, owing to its teeth, being adjustable to tables and supports of various thicknesses.

Having thus described my invention, what I claim as new, and desire to secure by Letters Patent, is—

The casing A of a meat-cutter having a supporting-foot, $b$, and a toothed boss, E F, attached to said foot, in combination with the toothed arm G, with set-screw $g$, substantially as and for the purpose set forth.

CHARLES F. LEOPOLD.

Witnesses:
JOHN A. WIEDERSHEIM,
W. F. KIRCHER.